US009686612B2

(12) United States Patent
Yerrace et al.

(10) Patent No.: US 9,686,612 B2
(45) Date of Patent: Jun. 20, 2017

(54) TRANSFERENCE OF TIME SENSITIVE DATA BETWEEN A WIRELESS COMMUNICATION DEVICE AND A COMPUTER SYSTEM

(75) Inventors: Frank Yerrace, Woodinville, WA (US); Yuk Lai Suen, Kirkland, WA (US); John Bregar, Bainbridge Island, WA (US); Rian Chung, Redmond, WA (US); Kenneth Cooper, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 478 days.

(21) Appl. No.: 13/230,777

(22) Filed: Sep. 12, 2011

(65) Prior Publication Data

US 2013/0064386 A1 Mar. 14, 2013

(51) Int. Cl.
*H04B 3/00* (2006.01)
*H04B 5/00* (2006.01)
*H04R 5/033* (2006.01)

(52) U.S. Cl.
CPC ....... *H04R 5/033* (2013.01); *H04R 2201/107* (2013.01); *H04R 2225/55* (2013.01); *H04R 2420/07* (2013.01)

(58) Field of Classification Search
CPC ....................................................... H04L 67/04
USPC ....................................... 381/77-80; 455/425
See application file for complete search history.

(56) References Cited

U.S. PATENT DOCUMENTS 5,949,891 A * 9/1999 Wagner et al. ................. 381/98
7,233,808 B2 * 6/2007 Mooney et al. .............. 455/557
7,415,525 B2 8/2008 Lu et al.
8,433,430 B2 * 4/2013 Sinai ............................... 700/94
2002/0172185 A1 * 11/2002 Mito et al. .................... 370/347
2003/0045235 A1 * 3/2003 Mooney .............. H04M 1/6066 455/41.1

(Continued)

OTHER PUBLICATIONS

"Introduction to the WDF User Mode Driver Framework", Retrieved at <<http://download.microsoft.com/download/a/f/7/af7777e5-7dcd-4800-8a0a-b18336565f5b/umdf_intro.doc>>, May 16, 2006, pp. 12.

(Continued)

*Primary Examiner* — Duc Nguyen
*Assistant Examiner* — Phan Le
(74) *Attorney, Agent, or Firm* — Workman Nydegger

(57) ABSTRACT

One or more techniques and/or systems are provided for communicating between two or more drivers respectively controlling and/or managing different channels through which data is transferred between a wireless communication device and a computer system and/or between a controller of the computer system and an application of the computer system. Typically, at least one of the channels is configured to transmit time sensitive data (e.g., such as audio data) while another channel is configured to transmit time insensitive data (e.g., such as call control data). A device driver interface may be configured to provide a medium through which the two or more drivers can communicate. The techniques and/or systems find particular application with respect to Bluetooth headsets used in combination with a computer system comprising a system on chip architecture, but other applications are also contemplated.

20 Claims, 7 Drawing Sheets

(56) References Cited

U.S. PATENT DOCUMENTS

| | | | | |
|---|---|---|---|---|
| 2007/0105548 | A1 | 5/2007 | Mohan et al. | |
| 2007/0269049 | A1* | 11/2007 | Glatt et al. | 381/23.1 |
| 2010/0169900 | A1 | 7/2010 | Lin | |
| 2010/0227589 | A1* | 9/2010 | Cook et al. | 455/411 |
| 2011/0201327 | A1* | 8/2011 | Kaul | H04L 67/1095<br>455/425 |

OTHER PUBLICATIONS

"Hands-Free Profile", Retrieved at <<http://msdn.microsoft.com/en-us/library/ms881893.aspx>>, Retrieved Date: Aug. 3, 2011, pp. 5.

"Adding UART Bluetooth Solution to i.MX Windows CE 5.0/6.0", Retrieved at <<http://cache.freescale.com/files/dsp/doc/app_note/AN3979.pdf>>, Retrieved Date: Aug. 3, 2011, pp. 1-12.

* cited by examiner

TRANSFERENCE OF TIME SENSITIVE DATA BETWEEN A WIRELESS COMMUNICATION DEVICE AND A COMPUTER SYSTEM

BACKGROUND

Today, there is a great demand for peripheral devices (e.g., Bluetooth headsets, speakers, keyboards, etc.) that can be wirelessly coupled to a computer system and/or mobile device. Reducing the number of wired connections generally make the peripherals less cumbersome and more aesthetically pleasing because there are fewer, if any, wires to hide from view. Numerous wireless communication protocols currently exist for coupling a computer system and/or mobile device to peripheral devices. For example, wireless local area network (WLAN) communication protocols (e.g., also referred to WiFi) and Bluetooth protocols are just a few of the communication protocols commonly used to connect one or more peripheral devices to a computer system and/or mobile device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for transferring audio data between a wireless communication device (e.g., such as a hands-free Bluetooth device) with a computer system (e.g., cellular telephone, personal computer, tablet, etc.), establishing a wireless connection between the wireless communication device and the computer system, and transmitting data between computer software and a wireless controller of the computer system are provided. Such systems and/or techniques may be particularly relevant where audio data (e.g., or other time sensitive data) is transmitted to and/or from the wireless controller through a different channel than other wireless communication data (e.g., such as control data and/or other less time sensitive data). For example, with respect to a hands-free Bluetooth device, audio data for the Bluetooth device may pass through a hardware connection to a Bluetooth controller rather than through a standard Bluetooth Host Controller Interface (HCI) (e.g., through which the other wireless communication data may pass). Thus, the audio data may be channeled in such a manner that it bypasses the Bluetooth HCI and/or other components that make up a channel for transmitting other wireless communication data (e.g., besides audio data) between the computer software and the wireless controller. It will be appreciated that such a design may be referred to by those skilled in the art as a Bluetooth sideband design or Bluetooth HCI bypass.

As provided herein, when an intention is received to connect a wireless communication device with a computer system, a determination is made as to whether a device driver interface for the connection has been created. If a device driver interface has not been created for the connection, a device driver interface may be created.

The device driver interface is configured to provide a medium through which an audio driver (e.g., configured to channel audio data and/or other time sensitive data) can communicate with a wireless communication driver (e.g., configured to channel the other wireless communication data) and/or vice-versa. For example, the wireless communication driver can provide the audio driver with information about whether the wireless communication device is connected and/or with other information about the wireless communication device (e.g., such as descriptive or capabilities information). Moreover, in one embodiment, the device driver interface may be configured to limit (e.g., minimize) the flow of information between the audio driver and the wireless communication driver. For example, the audio driver may make a general request for information from the wireless communication driver and the device driver interface may limit the amount of information provided (back) to the audio driver to merely that information which the device driver interface determines to be relevant for the audio driver to perform its functions.

It will be appreciated that the systems and/or techniques described herein have particular applicability with system on chip architectures, but are not intended to be limited as such. Moreover, by separating the audio driver from the wireless communication driver and providing an interface for communication between the two drivers, a first developer skilled in audio development (e.g., but not wireless communication driver development) may develop the audio driver and a second developer skilled in wireless communication development (e.g., but not audio driver development) may develop the wireless communication driver. That is, for example, a developer knowledgeable in Bluetooth driver development may not be required to know details of audio driver development and/or vice-versa. Thus, audio drivers may be developed substantially independently of wireless communication drivers, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
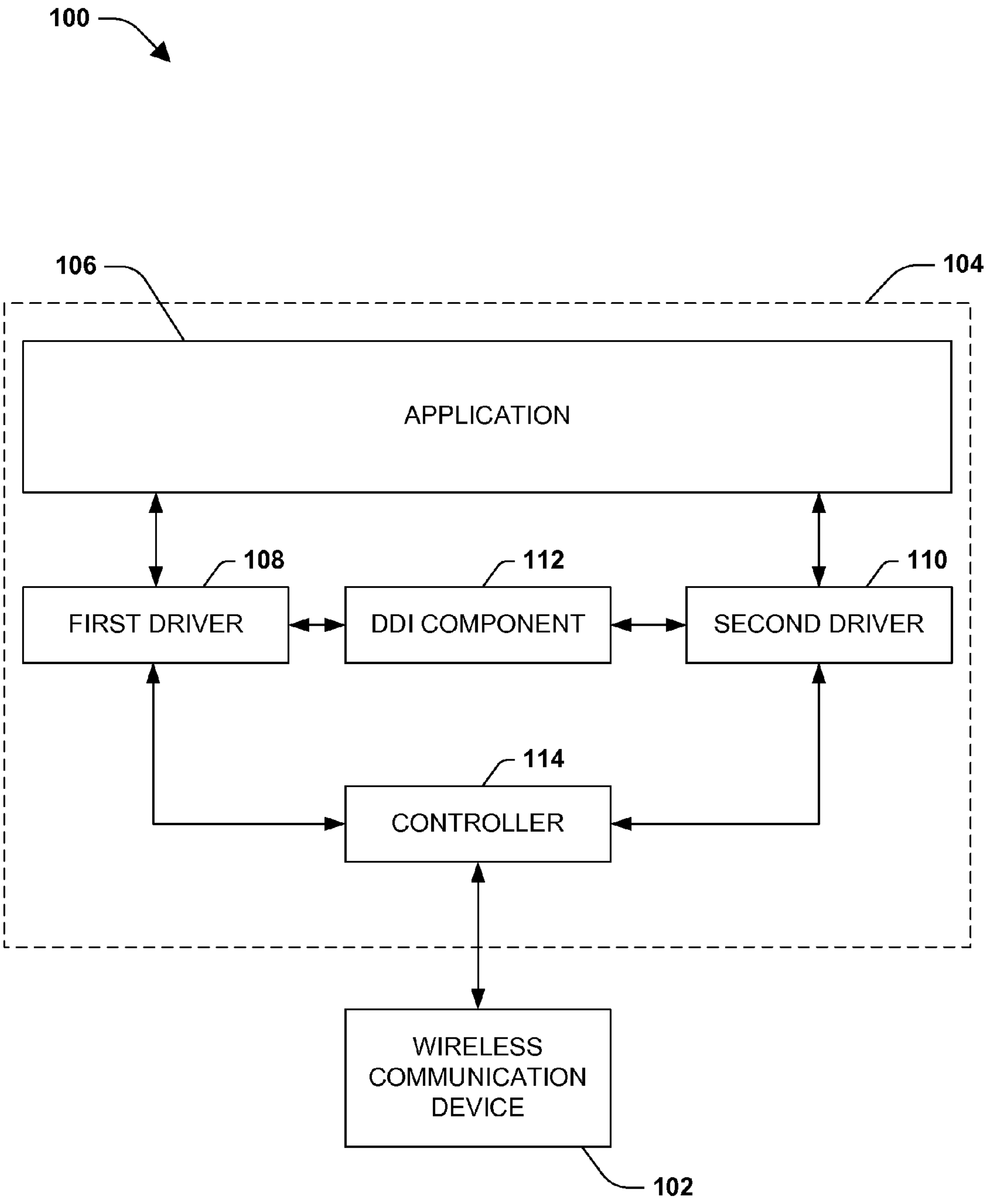
FIG. 1 is an exemplary system for connecting a wireless communication device with a computer system.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

In computer systems, sideband generally refers to a common system design in which one or more types of data for a peripheral device (e.g., a wireless communication device) are passed through a hardware connection to a controller rather than through a standard host controller interface (HCI). For example, Bluetooth sideband generally refers to a design in which audio data for a Bluetooth device passes through a hardware connection (e.g., audio codec) to a Bluetooth controller rather than through a standard Bluetooth HCI.

It will be appreciated that sideband drivers generally require an implementer to have knowledge about a plurality of different types of drivers and/or technologies. For example, an implementer of a Bluetooth sideband driver may be required to have knowledge of audio drivers, Bluetooth drivers, and Bluetooth technology. This can often be problematic because some, if not many, software developers have specialized knowledge in a select type(s) of driver(s) and/or technologies. For example, with respect to Bluetooth devices, generally speaking, software developers typically have specialized knowledge in audio driver development or Bluetooth driver development (e.g., but not both).

Thus, systems and/or techniques are provided herein for separating an audio driver (e.g., or other driver for channeling time sensitive data) from a wireless communication driver. In this way, details of the audio driver (e.g., through which audio data and/or other time sensitive data is transmitted) are separated from details of wireless communication driver (e.g., through which other wireless communication data (e.g., that is time insensitive) is transmitted). In this way, the audio driver may be developed by a first developer (e.g., with specialized skills in audio development) substantially independently from the wireless communication driver (e.g., such as a wireless profile driver) developed by a second developer (e.g., with specialized skills in wireless communication development), for example.

By way of example, the systems and/or techniques provided herein may be applicable to the development of drivers for a hands-free communication device (e.g., a Bluetooth headset). A hands-free profile driver may be developed substantially independently of an audio driver. Upon detecting and/or discovering a connection of a communication device and the computer system, the audio driver and the hands-free profile driver may be operably coupled to one another via a device driver interface (DDI) that may be configured to channel information between the audio driver and the hands-free profile driver. When the communication device desires to provide audio to the computer system, a request may be transmitted from the audio driver to the the hands-free profile driver requesting that the hands-free profile driver open a wireless communication channel through which audio is delivered to the communication device, for example.

It will be appreciated that the systems and/or techniques described herein find particular application with respect to channeling time sensitive data in the context of system on chip architectures. Stated differently, system on chip architectures typically use a universal asynchronous receiver/transmitter (UART) for channeling data to the wireless controller, and thus are less able (e.g., or not able) to provide for time sensitive data transmission. Thus, the systems and/or techniques described herein are particularly relevant for transmitting time sensitive data in a system on chip environment where time sensitive data, such as audio data, for example, is routed to bypass the UART. However, to the extent practical, the features described herein are not intended to be limited to such an application and may find applicability in other system architectures (e.g., such as with system in package architectures and/or conventional PC architecture designs), for example.

Moreover, it will be appreciated that while specific reference is made herein to Bluetooth devices and drivers that may be used to transmit data from an application to a wireless controller and ultimately to the Bluetooth device and/or vice-versa, the instant disclosure, including the scope of the claims, is not intended to be limited as such to the extent possible. That is, the systems and/or techniques described herein may find application in other situations where a wireless communication device is coupled to computer system and/or where a first type of data (e.g., such as time sensitive data) is routed via a different channel than a second type of data (e.g., such as time insensitive data) transmitted to and/or from a wireless controller of the computer system and/or to and/or from the wireless communication device. For example, those of skill in the art will appreciate that wireless communication devices may be operably coupled to a computer system through a number of a wireless communication protocols (e.g., such as WiFi, Bluetooth, etc.), and the systems and/or techniques described herein may be applicable for connecting wireless communication devices to the computer system via one of more of such protocols.

FIG. 1 illustrates an example environment 100 of a system for transferring audio between a wireless communication device 102 and a a computer system 104. The computer system 104 may be a personal computer, tablet, mobile device (e.g., such as a cellular telephone) and/or other device configured to (e.g., capable of) running (e.g., loading and executing) an application 106, for example. The wireless communication device 102 may be one of numerous types of wireless communication devices commonly coupled to a computer system via a wireless communication protocols. For example, the wireless communication device 106 may be a hands-free Bluetooth headset, wireless (e.g., Bluetooth, WiFi, etc.) speakers, microphone, etc.

It will be appreciated that for purposes of clarity, FIG. 1 excludes some portions of a computer system 104 and/or wireless communication device 102 that may be necessary to practically implement the system herein described. For example, the computer system 104 may comprise one or more transceivers for transmitting data to the wireless communication device and/or for receiving data from the wireless communication data. However, those of skill in the art will readily appreciate that such components may be included in the computer system 104.

Generally speaking, the wireless communication device 102 is configured to route at least two types of data through at least two channels (e.g. although in one embodiment the two or more types of data may be transmitted between the wireless communication device 102 and the computer system via merely one channel and subsequently separated at the computer system into two or more channels). In one embodiment, at least one of two types of data is a time sensitive type of data (e.g., such as audio data, video data, etc.). For example, in the case of a hands-free Bluetooth headset, the wireless communication device 102 may be configured to route time sensitive audio data and to route at least one of setup and control data for controlling a call via the hands-free Bluetooth headset (e.g. which is generally time insensitive).

As illustrated, the computer system 104 of the example environment 100 comprises a first driver 108 through which at least a first type of data is routed between the application 106 and a controller 114, and a second driver 110 through which at least a second type of data is routed between the application 106 and the controller 114. By way of example, in the case of a hands-free Bluetooth headset, the first driver 108 may be configured to channel the audio data or other time sensitive data between the controller 114 and the application 106 and the second driver 110 may be configured to channel control data or other time insensitive data between the controller 114 the application 106.

Figure 2:
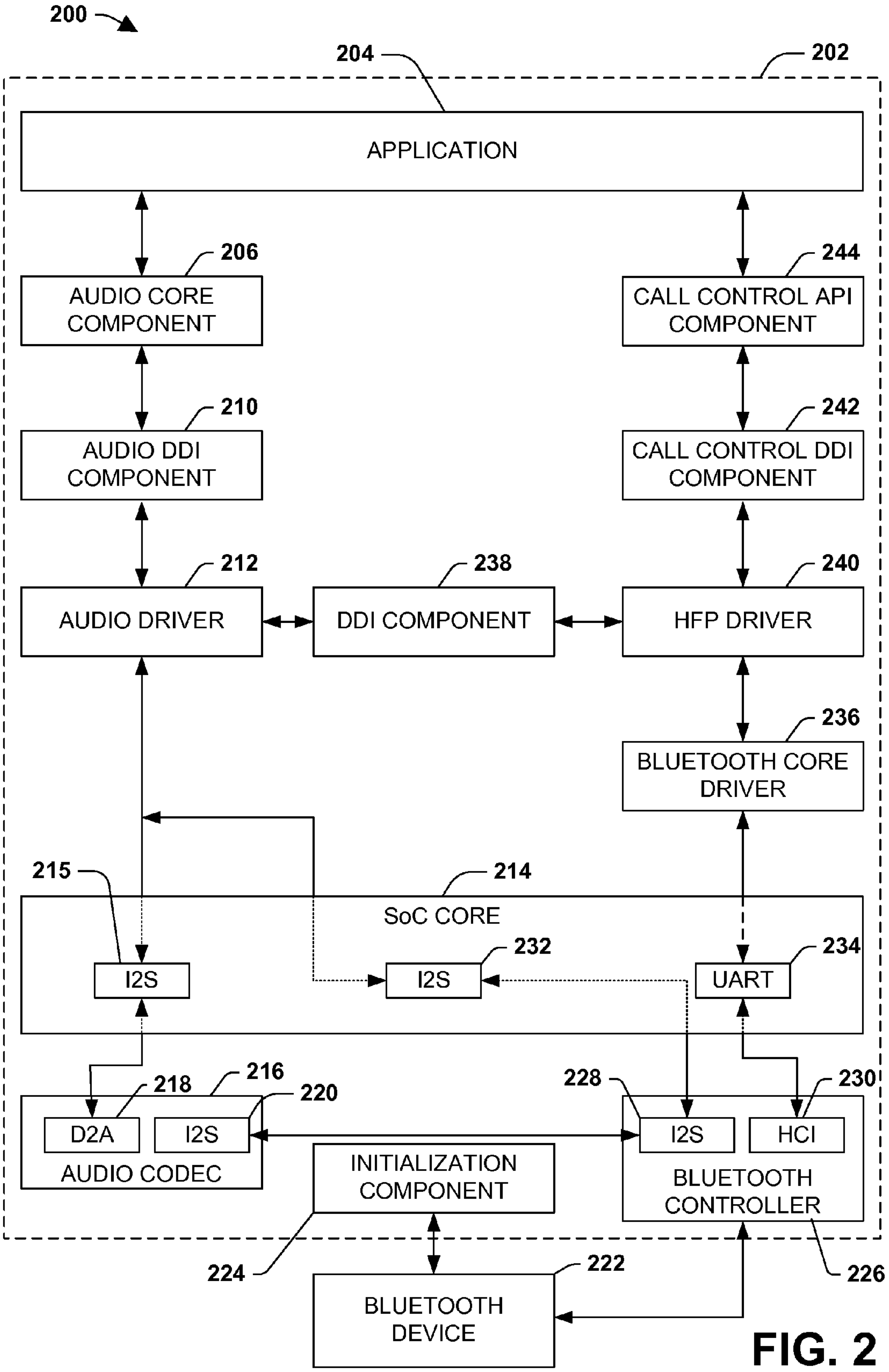
FIG. 2 is an exemplary system illustrating communication channels through which a Bluetooth device can communicate with a computer system.

It may be appreciated that sideband channel, sideband audio channel, and/or the like may be used herein to in a broad sense to refer to time sensitive data (e.g., such as audio data) that is routed between the controller 114 (e.g., or 226 in FIG. 2) and the application 106 (e.g., or 204 in FIG. 2), whereas wireless audio channel and/or the like may be used herein to refer to a channel configured to route audio data or other time sensitive data between the controller 114 and the wireless communication device 102 (e.g., or 222 in FIG. 2). Thus, it will appreciated that the same data (e.g., audio data) may flow through two or more channels when it is transmitted from the application 106 to the wireless communication device 102 and/or vice-versa.

It will be appreciated that while the types of data transmitted via (e.g., controlled by) the first and second drivers may not be mutually exclusive, there is generally at least one type of data that may be channeled through the first driver 108 that is not channeled through the second driver 110 and/or vice-versa. For example, in one application, the computer system 104 may utilize a system on chip architecture that uses a universal asynchronous receiver/transmitter (UART) instead of a universal serial bus (USB) to transmit data to the controller 114 and/or receive data from the controller 114. Because UART is less able to provide time sensitive data transmission, a bypass channel (e.g., a sideband audio channel) may be implemented (e.g., in addition to UART) to pass time sensitive data (e.g., such as audio data) between the application 106 and the controller 114. Thus, the time sensitive data may be transmitted between the application 106 and the controller 114 (e.g., and ultimately between the application 106 and the wireless communication device 102 via a channel that passes through the first driver 108 while other, less time sensitive data and/or time insensitive data (e.g., such as control data) may be transmitted between the application 106 and the controller via a channel that passes through the second driver 110 (e.g., via UART). Thus, the time sensitive data does not interact with the second driver 110, for example, because UART is less able to provide for time sensitive data transmission and/or reception.

The example environment 100 of the example computer system 104 further comprises a device driver interface (DDI) component 112 configured to provide a DDI for interfacing between the first driver 108 and the second driver 110. In this way, the first driver 108 may interact with the second driver 110 and/or vice versa. For example, the first driver 108 may receive a request from the application 106 to transmit audio data to the wireless communication device 102 and the first driver 106 may issue a request via the DDI of the DDI component 112 to the second driver 110 to open a communication channel through which audio data can be transmitted between the controller 114 and the wireless communication device 102 and/or vice-versa (e.g., where the second driver 110 requests the first driver 108 to open the sideband audio channel so that audio data can be transmitted from the controller 114 to the application 106). The first driver 108 may also receive information about the wireless communication device 102 from the second driver 110 via the DDI of the DDI component 112. For example, the first driver 108 may receive information from the second driver 110 providing an indication of whether the wireless communication device 102 is connected to the computer system 104 and/or providing information about the wireless communication device 102 (e.g., such as device information, a type of headset, etc.).

Stated differently, while the first and second drivers 108, 110 may operate upon different types of data transmitted between the wireless communication device 102 and the application 106, the first and second drivers 108, 110 generally do not function totally independent of one another. That is, at least some information known to the second driver 110 may be utilized by the first driver 108 and/or at least some information known to the first driver 108 may be utilized by the second driver 110. Thus, the DDI component 112 may provide a DDI for operably coupling the first driver 108 with the second driver 110. Moreover, in one embodiment, the DDI component 112 may be configured to limit (e.g., restrict and/or minimize) the flow of information between the first driver 108 and the second driver 110. For example, in one embodiment the first driver may issue a request to the DDI component 112 for information known to the second driver 110 and/or available to the second driver 110 (e.g., to customize the first driver 108 based upon the second driver 110—allowing a user to see what type of wireless communication device 102 is connected with the first driver). In response, the DDI component 112 may process the request, acquire the requested information from the second driver 110, and provide at least a portion of the information requested to the first driver 108. In this way, the DDI component 112 may act as an abstraction layer between the first and second drivers 108, 110 and may manage the flow of information between the two drivers 108, 110, for example.

It will be appreciated that FIG. 1 (e.g., and the remaining Figures) merely illustrates an example schematic(s) of a system(s) that may be configured to transfer audio between a wireless communication device and a computer system and is(are) not intended to be interpreted in a limiting manner. For example, while FIG. 1 illustrates the first driver 108, the DDI component 112, and the second driver 110 as separate components, one or more of said components 108, 112, and/or 110 (e.g., and/or other components) may be comprised in a single hardware component, for example. Thus, the example schematic is merely intended to provide examples components of a system that may function as herein described, and is not intended viewed as limiting the scope of the disclosure, including the scope of the claims.

FIG. 2 illustrates yet another example environment 200 of a system for channeling data between an application 204 (e.g., 106 in FIG. 1) of a computer system 202 (e.g., 104 in FIG. 1), a controller 226 of the computer system 202, and a wireless communication device (e.g., 102 in FIG. 1). More specifically, FIG. 2 illustrates an example environment 200 of a communication system of a computer system 202 for providing communications related data between an application 204 (e.g., such as a soft-phone application) and a hands-free Bluetooth device 222 (e.g., such as a Bluetooth speakerphone). As provided above, the terms "computer system" are used herein in a broad sense to describe a system (e.g., comprised of one or more hardware components) that is configured to (e.g., capable of) execute an application 204 via one or more processors. For example, the computer system 202 may comprise a tablet, personal computer, cellular telephone, etc.

An application 204 may be executed via a processor (not shown) of the computer system 202 and may be configured to generate and/or receive both time sensitive data transmissions (e.g., such as audio data) and data transmissions that are time insensitive and/or less time sensitive (e.g., such as control data indicative of call commands generated at the Bluetooth device 222). For example, the application 204 may be a soft-phone application configured to provide an Internet based solution for voice and/or video communications between an entity using the computer system 202 and another entity. In this way, the application 204 may be configured to facilitate communications between two or more entities, for example.

The example environment 200 of the example computer system 202 also comprises an initialization component 224 configured to initialize a connection between the computer system 202 and the Bluetooth device 222. For example, the initialization component 224 may be configured to detect the presence of a spatially proximate Bluetooth device 222 and/or to receive a request from the Bluetooth device 222 to initialize a connection. In one embodiment, upon making such a detection and/or receiving such a request, the initialization component 224 may request authorization from an entity (e.g., such as user of the computer system 202) to initialize a connection between the computer system 202 and the Bluetooth device 222.

It will be appreciated that while the initialization component 224 is represented herein as uncoupled from other components of the computer system 202, the initialization component is generally operably coupled to one or more other components of the computer system 202. For example, in one embodiment, the initialization component 224 may be operably coupled to a hands-free profile (HFP) driver component 240, for example.

Upon receipt of the authorization (e.g., or upon detection of the Bluetooth device 222 and/or receipt of a request by the Bluetooth device 222 if no such authorization is required), the initialization component 224 may initiate a request to couple the computer system 202 with the Bluetooth device 222. For example, in one embodiment, the initialization component 224 may make a request to prepare two or more channels for communicating data between the Bluetooth device 222 and the computer system 202, or more particularly, between the Bluetooth device 222 and the application 204 of the computer system 202. At least one of these channels may be configured to transmit time sensitive data (e.g., audio data) between the application 204 and the Bluetooth device 222 while one or more other channels may or may not be configured to process time insensitive data (e.g., such as control data and/or other wireless communication data). For example, as will be described in more detail below, at least one channel may comprise a UART component 234 (e.g., comprised in a SoC core component 214) that is not configured to transmit time sensitive data. Thus, time sensitive data may be routed to avoid the UART component 234, for example.

By way of example in the illustrated system 200, an audio channel and a Bluetooth call control channel may be created. For purposes of clarity, the channels may be defined by components through which the different types of data interact. For example, the audio channel (e.g., or audio sideband channel) (e.g., which may transmit time sensitive data, such as audio data) may be comprised of a Bluetooth controller component 226, an audio codec component 216, an SoC core component 214, an audio driver component 212, audio device driver interface (DDI) component 210, and an audio core component 206, for example. The other channel (e.g., which may be configured to transmit data that is time insensitive, such as call control data) may be comprised of a Bluetooth controller component 226, the SoC core component 214, a Bluetooth core driver component 236, a hands-free profile (HFP) driver component 240, a call control DDI component 242, and a call control API component 244, for example. It will be appreciated that the components illustrated herein and further described below are merely intend to represent an example schematic and are not intended to be interpreted in a limiting manner. Moreover, while respective components that comprise respective channels are illustrated as residing within the computer system 202, it will be appreciated that one or more of the components may reside within the Bluetooth device. For example, in one embodiment, the audio codec component 216 may be comprised within Bluetooth device 222.

Respective components of respective channels in the example environment 200 will now be described in more detail, beginning with components of the audio channel that are configured to provide a pathway for delivering time sensitive data (e.g., audio data) between the application 204 and the Bluetooth device 222. Once respective components of the audio channel have been described, respective components of the other channel, configured to provide a pathway for delivering time insensitive data (e.g., such as call control data) between the application 204 and the Bluetooth device 222, for example, will be described.

Beginning at the application 204 and proceeding to the Bluetooth device 222, the audio channel comprises an audio core component 206, an audio DDI component 210, an audio driver component 212, a SoC core component 214, an audio codec component 216, and a Bluetooth controller component 226. The audio core component 206 is configured to enable the application 204 to manage the flow of audio between the application 204 and the Bluetooth device 222. For example, in one embodiment, the audio core component 206 is configured to provide an audio application programming interface (API), such as a WASAPI, for example, that the application 204 can utilize to manage the flow of audio. For example, the application 204 can use the audio API to, among other things, create and initialize a stream of audio between the application 204 and the Bluetooth device 222 (e.g., with the assistance of the HFP driver component 240 as will be described in detail below), monitor a data rate of an audio stream, control and/or monitor volume levels, etc.

The audio device driver interface (DDI) component 210 is configured to provide an interface for promoting an interaction between the audio driver component 212 and the audio core component 206. That is, stated differently, the audio DDI component 210 is configured to provide the audio core component 206 and/or the application 204 with access to the audio driver component 212. In some embodiments, the audio DDI component 210 may also be configured to provide the audio core component 206, the application 204, and/or other components of the computer system 202 with access to the Bluetooth device 222 and/or components of the Bluetooth device 222 that are managed/controlled by the audio driver 212 (e.g., such as speakers and/or microphones of the Bluetooth device 222). In this way, the audio DDI component 210 may act as a portal for communication between the computer system 202 and the audio driver component 212 and/or the Bluetooth device 222, for example.

The audio driver component 212 (e.g., through which audio data is transmitted between the Bluetooth device 222 and the computer system 202) is configured to act as a translator between the Bluetooth device 222 and the audio core component 206 (e.g., or application 204). For example, the application 204 and/or audio core component 206 may invoke a routine in the audio driver component 212 and in response to the invocation, the audio driver component 212 may issue at least one of a command, instruction, and data to the Bluetooth device 222 (e.g., via the SoC Core 214 and/or via the DDI component 210). Conversely, upon receipt of data, commands, and/or instructions from the Bluetooth device 222 (e.g., via the SoC Core 214 and/or via the DDI component 210), the audio driver component 212 may invoke a routine in the application 204 and/or audio core component 206 based upon the received data, for example. In this way, programmers developing the audio core component 206 and/or the application 204 can write code that is substantially independent of the audio driver component 212 (e.g., which is generally hardware dependent) and/or the Bluetooth device 222.

It will be appreciated to those skilled in the art that while specific reference is made herein to audio data and audio driver components, the scope of the disclosure, including the scope of the claims, is not intended to be limited as such to the extent practical. For example, the audio channel may route audio data and/or other types of time sensitive data known to those skilled in the art. Thus, to the extent practical, the audio driver component 212 may be substituted with another type of driver configured to translate time sensitive data (e.g., such as video data).

The system on a chip (SoC) core component 214 generally comprises a microcontroller, microprocessor, DSP core, and/or other hardware components and accompanying software configured to control the flow of data within the computer system 202 and/or to control the flow of data between one or more wireless communication devices, such as the Bluetooth device 222, and the computer system 202. The SoC core component 214 may also be configured to process data generated within the computer system 202 and/or received by the computer system 202 from one or more wireless communication devices (e.g., including the Bluetooth device 222). In the example environment 200, several components (e.g., and accompanying software) of the SoC core component 214 are illustrated for purposes of describing the distribution of data between the application 204 and the Bluetooth device 222. However, the SoC core component 214 may comprise other components (e.g., and accompanying software) not described herein. That is, in the illustrated example environment 200 merely some of the components and/or functions of the SoC core 214 are illustrated and other components not illustrated herein may be comprised within the SoC core component 214 and/or other functions not described herein may be performed by the SoC core component 214, for example.

In the illustrated embodiment, the SoC core component 214 illustrates two (e.g., alternative and/or supplemental) pathways through which audio data may be routed between the Bluetooth controller component 226 and the audio driver component 212 and a pathway through which other wireless communication data (e.g., such as setup and/or control data) may be routed. More specifically, as illustrated herein, a first pathway for routing audio data may be established using a first I2S interface 215 or other audio interface configured to transmit audio data between the audio driver component 212 and the audio codec component 216 (e.g., which may subsequently transmit the audio data to an I2S interface 228 of the Bluetooth controller component 228, for example). Audio data may also and/or instead be routed between the audio driver component 212 and the Bluetooth controller component 226 via a second I2S interface 232 or other audio interface (e.g., which bypasses the audio codec component 216), for example.

The SoC core component 214 also comprises yet another component 234 (e.g., comprising a UART interface) which may be configured to transmit setup and/or control data (e.g., and/or other time insensitive data), for example between the Bluetooth controller component 226 and the Bluetooth core driver component 236, for example.

It will be appreciated that the types of components the SoC core component 214 comprise can depend upon the desired functions the SoC core component 214. Thus, the SoC core component 214 is not intended to be limited to the components described herein. Moreover, one or more of the components described herein may not be comprised in the SoC core component 214 in another embodiment.

The audio codec component 216 may be configured to convert the audio data received from the SoC core 214 from a digital format to an analog format (e.g., using a digital-to-analog (D2A) component 218) that can be projected from a speaker and/or to convert audio data received from a microphone from an analog format to a digital format, for example.

Depending upon how audio data is routed to the Bluetooth controller component 226, the audio codec component 216 may also comprise an I2S interface 220 or other audio interface (e.g., through which audio data and/or other time sensitive data can interface) that is configured to transmit audio data and/or other time sensitive data between the SoC Core 214 and the Bluetooth controller component 226, The audio channel (e.g., or audio sideband channel) also comprises a Bluetooth controller component 226 configured to receive the audio data from the audio driver component 212 (e.g., via the audio codec component 216 and/or directly from the SoC core component 214 and to transmit the audio data to the Bluetooth device 222 via a wireless audio channel.

Beginning at the application 204 and proceeding to the Bluetooth device 222, the other channel (e.g., for routing other wireless communication data that is time insensitive) comprises a call control API component 244, a call control DDI component 242, the hands-free profile (HFP) driver component 240, a Bluetooth core driver component 236, the SoC core component 214, and the Bluetooth controller component 226. The call control API component 244 is configured to enable the application 204 to manage the flow of call control data or other wireless communication data between the application 204 and the Bluetooth device 222. By way of example, the call control API component 244 can be configured to provide an application programming interface (API) that the application 204 can utilize to manage the call control aspects of the Bluetooth device 222 (e.g., a Bluetooth headset). For example, the application 204 can use the call control API to, among other things, create and transmit call control data to the Bluetooth device 222, define an operation to be performed when specified data is received from the Bluetooth device 222, etc.

The call control DDI component 242 is configured to provide an interface for promoting an interaction between the HFP driver component 240 and the call control API component 244. That is, stated differently, the call control DDI component 242 is configured to provide the call control API component 244 and/or the application 204 with access to the HFP driver component 240 and/or the Bluetooth core driver component 236, for example. In some embodiments, the call control DDI component 242 may also be configured to provide the call control API component 244, the application 204, and/or other components of the computer system 202 with access to the Bluetooth device 222 and/or components of the Bluetooth device 222 that are managed/controlled by the HFP driver component 240 (e.g., such as a component that manages a call control menu on the Bluetooth device). In this way, the call control DDI component 242 acts as a portal for communication between the computer system 202 and the HFP driver component 240 and/or the Bluetooth device 222, for example.

It will be appreciated that to use wireless technology, the computer system 202 generally interprets one or more wireless profiles. Respective profiles provide definitions of possible applications and general behaviors that wireless enabled devices use to communicate and may comprise, among other things, settings to parameterize and/or control communications between the wireless communication device (e.g., the Bluetooth device 222) and the application 204.

In the illustrated example environment 200, the computer system 200 is configured to interpret a hands-free profile via the HFP driver component 240, which translates data related to the hands-free profile that is received from the Bluetooth device 222 and/or sent to the Bluetooth device 222. Stated differently, the phrase "hands-free profile" and/or the like may be used herein to refer to a communication protocol that is used to transmit data between a computer system 202 and the Bluetooth device 222 via the HFP driver component 240, and the HFP driver component 240 may be configured to interpret and/or translate the data transmitted via the hands-free profile communication protocol for the computer system 202, or more particularly for the application 204. It will be appreciated that other types of communication protocols, such as headset profile (HSP), cordless telephony profile (CTP), an advanced audio distribution profile (A2DP), and/or other Bluetooth profiles known to those skilled in the art, may also be implemented and the type of driver may depended upon the protocol used. For example, in another embodiment, the HFP driver component 240 may be replaced with a HSP driver component, for example. Moreover, it will be appreciated that while specific reference is made herein to Bluetooth profiles, the profiles may be non-Bluetooth profiles, such as WiFi profiles if hands-free Bluetooth device 222 is replaced with a WiFi enabled device, for example.

It will be appreciated that because the HFP driver component 240 may be replaced by a driver component that is configured to utilize a different communication protocol (e.g., such as a different profile), the HFP driver component 240 may be referred to more broadly herein as a wireless communication driver (e.g., through which wireless communication data is transmitted between the wireless communication device and the computer system).

The Bluetooth core driver component 236 is configured to act as a translator between the Bluetooth device 222 and the HFP driver 240. More specifically, the Bluetooth core driver component 236 is configured to provide routines that support the HFP driver component 240 (e.g., or other profile driver when the HFP driver is replaced with another profile driver). That is, the Bluetooth core driver component 236 may be configured to receive packets from the Bluetooth device 222 and deliver the packets (e.g., or a translated version of the packets) to the HFP driver component 240 and/or may be configured to receive packets from the HFP driver 240 and deliver the packets (e.g., or a modified/translated version of the packets) to the Bluetooth device 222 (e.g., via the SoC core 214 and/or the Bluetooth controller 226).

The channel for transmitting time insensitive data (e.g., such as call control data) also comprises the SoC core component 214 and more particularly the universal asynchronous receiver/transmitter (UART) component 234 configured to transmit time insensitive data to the Bluetooth device 222 and/or receive time insensitive data from the Bluetooth device 222. It will be appreciated that because the UART component 234 cannot generally provide time sensitive data transmission, time sensitive data (e.g., such as audio data) may be transmitted via another channel to avoid the UART component 234 (e.g., as described above with respect to the aforementioned audio channel).

The Bluetooth controller component 226 is configured to interface with the SoC core 214 of the computer system 202. For example, the Bluetooth controller component 226 may be configured to implement a radio that provides for communication between the computer system 202 and the Bluetooth device 222. Stated differently, the Bluetooth controller component 226 may be configured to manage/control the transmission/reception of data between the computer system 202 and the Bluetooth device 222.

As illustrated, the Bluetooth controller component 226 may be comprised of a plurality of components respectively configured to receive a particular type(s) of data (e.g., sent via a particular type(s) of communication channel(s). For example, in the illustrated embodiment, the Bluetooth controller comprises an integrated interchip sound (I2S) interface 228 and/or other (audio) interface through which audio data and/or other time sensitive data can be transmitted between the Bluetooth controller component 226 and the audio driver component 212. Moreover, the Bluetooth controller component 226 may comprise a host controller interface (HCI) component 230 configured to provide other communications between the Bluetooth device 222 and the SoC core component 214. For example, in one embodiment, setup and/or control data (e.g., or other time insensitive data) is transmitted from the Bluetooth device 222 to the SoC core component 214 via the HCI component 230.

Importantly, it will be appreciated that the audio data (e.g., or other time sensitive data) is generally not transmitted between the Bluetooth device 222 to the SoC core component 214 via the UART interface 234 and HCI 230. Rather, the audio data (e.g., and/or other time sensitive data) is transmitted between the Bluetooth device 222 and the audio driver component 212 via a sideband interface comprised of I2S component 228 within the Bluetooth controller 226 and the audio codec 216 and/or the SoC core 214 (e.g., because the UART component 234 is less able to provide time sensitive data transmission).

It will also be appreciated that because the audio data and/or other time sensitive data is transmitted through a different channel than other data to and/or from the Bluetooth device 222 and because separate drivers control the flow of information for respective channels, the audio driver component 212 may not be aware of when to open an audio channel and/or when to close the audio channel. Moreover, the audio driver component 212 may be aware of little to no information about the Bluetooth device itself. Thus, the example environment 200 further comprises a device driver interface (DDI) component 238 configured to operably couple the HFP driver component 240 (e.g., or other wireless communication driver and/or profile driver) with the audio driver component 212 (e.g., or other driver configured to manage a channel for routing time sensitive data).

The DDI component 238 is configured to provide a DDI through which the HFP driver component 240 and the audio driver component 212 can communicate. It will be appreciated that the communication may be one or two way communication. For example, in one embodiment, the HFP driver component 240 can provide information to the audio driver component 212 and/or make calls/requests to the audio driver component 212, but the audio driver component 212 cannot make return calls/requests. In another embodiment, the HFP driver component 240 can communicate with the audio driver component 212 and the audio driver component 212 can communicate with the HFP driver component 240. In this way, the audio driver component 212 can be provided with information that may be useful related to the Bluetooth device 222 from the HFP driver component 240 and/or vice-versa.

Herein are provided several examples of some of the forms of communication that may be transmitted between the audio driver component 212 and the HFP driver component 240 via the DDI component. For example, in one embodiment, the HFP driver component 240 (e.g., or other wireless communication driver) is configured to issue a call requesting the audio driver component 212 to open and/or close the sideband audio channel, and the DDI component 238 may transmit the request from the HFP driver component 240 to the audio driver component 212 and/or the audio driver component 212 may be configured to issue a call via the DDI component 238 requesting the HFP driver component 240 to open and/or close a wireless audio channel. As yet another example, the audio driver component 212 may request information from the HFP driver component 240 about the Bluetooth device 222 (e.g., such as a type of headset and/or other device information) via the DDI component 238. Based upon the received request and/or at its own determination the HFP driver 240 may furnish information about the Bluetooth device 222 (e.g., details related to the wireless communication device) to the audio driver component 212 via the DDI component 238. For example, the HFP driver 240 may furnish information about whether the Bluetooth device 222 is connected to the computer system 202, device identification information, and/or a type of device. In this way, the audio driver component 212 may display such information about the Bluetooth device 222 (e.g., so that a user can see what type of wireless communication device is connected with the audio driver component 212), for example. It will be appreciated that the aforementioned forms of communication are merely intended to provide examples of the types of communications that can take place between the HFP driver 240 (e.g., or other wireless communication driver and/or profile driver) and an audio driver 212 (e.g., or other driver for channeling time sensitive data) via the DDI component 238 and are not intended to limit the scope of the disclosure and/or the claims. That is, other forms of communication besides those herein described are also contemplated.

Moreover, as stated with respect to FIG. 1, it will be appreciated that the systems and/or techniques described herein are merely intended to provide examples for those skilled in the art and are not intended to be construed as limiting the scope of the disclosure, including the scope of the claims. For example, the DDI component 238 may be part of the audio driver component 212 and/or the HFP driver component 240. Moreover, in one embodiment, the call control DDI component 242 may be comprised within the HFP driver 240.

Figure 3:
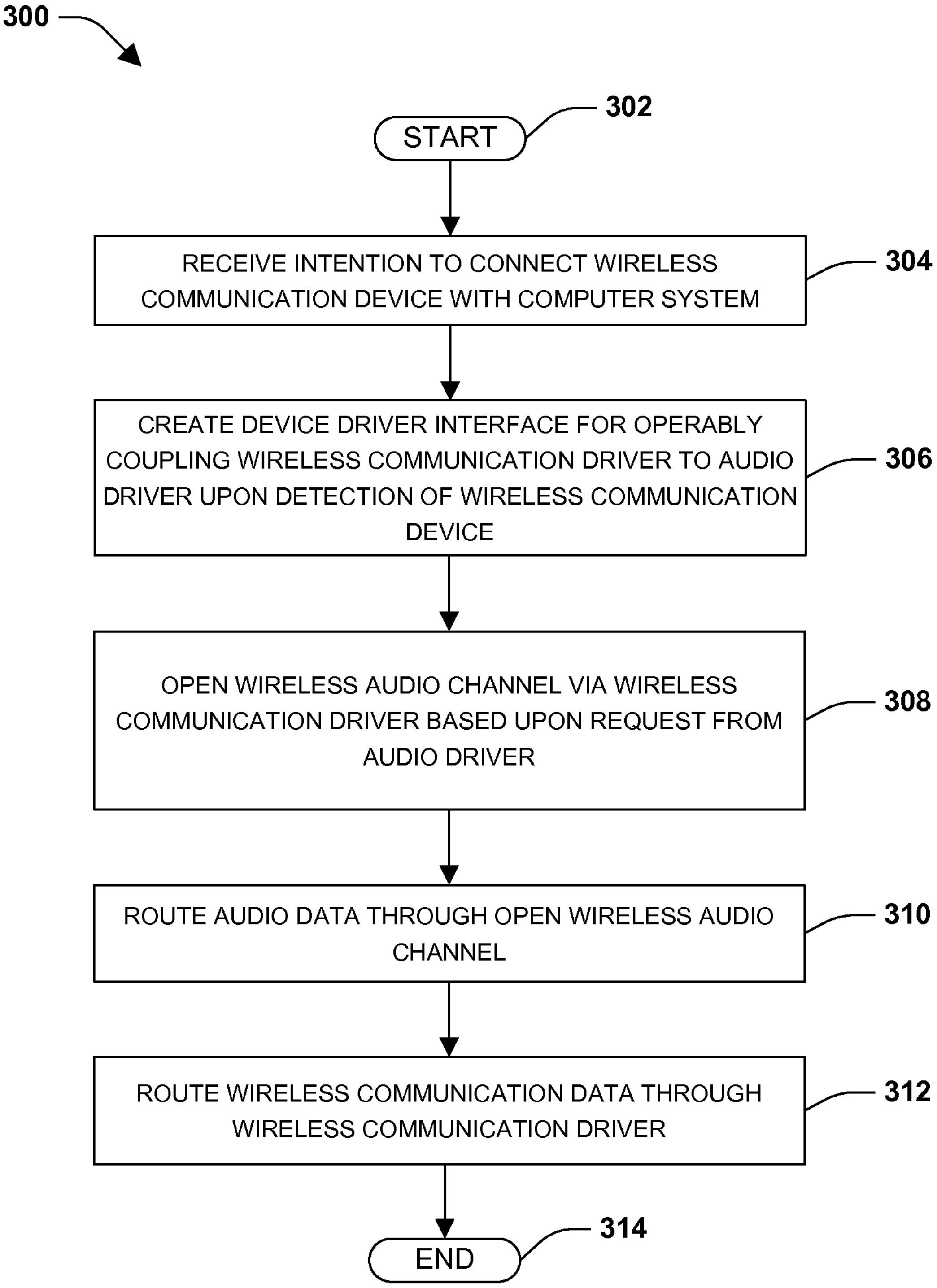
FIG. 3 is an exemplary method for connecting a wireless communication device with a computer system.

FIG. 3 illustrates an example method 300 for transferring audio between a wireless communication device (e.g., such as a hands-free Bluetooth device, WiFi device, etc.) and a computer system. As will be described in more detail below, generally the transference process comprises creating two or more data channels through which different types of data can be routed between a controller and an application of a computer system, for example. That is, in one embodiment, a first channel can be configured to route time sensitive data (e.g., such as audio data) and a second channel can be configured to route time insensitive data (e.g., such as call control data). Respective channels generally respectively comprise at least one driver and the two or more drivers can be configured to communicate with one another via a device driver interface (DDI).

By way of example, it may be desirable to connect a hands-free Bluetooth device (e.g., Bluetooth headset) to a computer system and at least two channels may be created for routing data between the computer system and the Bluetooth device and/or for routing data between the controller of the computer system and the application of the computer system. A first channel may be configured to route audio data (e.g., a type of time sensitive data) and a second channel may be configured to route other wireless communication data (e.g., such as wireless audio channel setup and call control data). Because the first channel merely channels audio data through a sideband interface, an audio driver through which the audio data is channeled may be unable to independently determine when or how to open and/or close a wireless audio channel (e.g., through which audio data is routed between the controller and the wireless communication device) or to determine status of the wireless audio channel. Therefore, a second driver (e.g., an HFP driver) that receives other wireless communication data from the Bluetooth device (e.g., and may be able to independently determine when a user is using the device for audio), may be configured to supply the audio driver with information, via the DDI, indicative of when to open and/or close the audio sideband channel and/or the audio driver may be configured to supply the HFP driver with information, via the DDI, indicative of when to open and/or close the wireless audio channel. It will be appreciated that the second driver may also be configured to supply the audio driver with other information about the Bluetooth device (e.g., such as device identification information) via the DDI, for example, based upon information specified in the DDI (e.g., which can limit the types of information passed between the audio driver and the second driver) and/or the audio driver may be configured to supply the second driver with information.

The example method 300 beings at 302 and an intention to connect the wireless communication device with the computer system is received at 304. It will be appreciated that the intention may be created by the computer system and/or by the wireless communication device. For example, a wireless communication device may be detected by the computer system if the wireless communication device is within a specified distance of the computer system and/or transmitting a wireless signal that can be detected by the computer system. It will be appreciated that the term wireless signal is used herein in a broad sense to include numerous types of wireless communication protocols known to those skilled in the art. For example, Bluetooth (e.g., which may also be defined by IEEE Standard 802.15) and/or WiFi (e.g., which may also be defined by IEEE Standard 802.11) are two commonly used wireless communication protocols. However, it will be appreciated that other wireless communication protocols are known to those skilled in the art and are contemplated for use herein.

An intention to connect the wireless communication device with the computer system may also be received from the wireless communication device. For example, the wireless communication device can generate a request to connect with the computer system.

At 306 in the example method 300, the two or more channels are created (e.g., including the installation of drivers for controlling the flow of data through the two or more channels) and a device driver interface is created for operably coupling the two drivers together. Generally speaking, at least one of the drivers is a driver for channeling time sensitive data and the other is a wireless communication driver (e.g., such as a profile driver) configured to channel time insensitive data. Thus, for example, a first channel (e.g., audio channel) that routes time sensitive data (e.g., audio data) between an application and a controller may be controlled by an audio driver and a second channel that routes time insensitive data (e.g., call control data) may be controlled by a profile driver (e.g., as may a wireless audio channel that route audio data between the controller and the Bluetooth device and/or within the Bluetooth device). For example, in one embodiment, the wireless communication device is a Bluetooth headset that is configured to generate/receive audio data and call control data (e.g., indicative of a user answering and/or hanging up a phone call via the Bluetooth headset). In such an embodiment, the audio data may be routed via a sideband channel that is opened and/or closed via an audio driver and wireless audio channel opened and/or close via a Bluetooth profile driver, and the call control data may be routed via a channel that is opened and/or closed (e.g., or otherwise controlled) via a Bluetooth profile driver (e.g., such as an HFP driver and/or an A2DP driver), for example.

It will be appreciated that while the two channels are generally distinct from one another and/or are not controlled by the same driver and/or set of drivers, the device driver interface may be utilized for coupling two or more drivers together. In this way, the two or more drivers can communicate via the device driver interface. That is, stated differently, one or more of the drivers may utilize information that is merely available to another driver and the device driver interface may be useful to provide such information from one driver (e.g., developed by one entity) to another driver (e.g., developed by another entity). Returning to the example of the Bluetooth headset, an audio driver (e.g., which is merely receiving audio data) may be unable to independently determine when to open and/or close the audio sideband channel and/or may be unable to independently collect information about the Bluetooth headset (e.g., such as a type of headset). Therefore, the audio driver may make a request to the Bluetooth profile driver for such information via the DDI and/or the Bluetooth profile driver may call the audio driver via the DDI when the sideband audio channel should be opened and/or closed. In this way, the first and second drivers may be developed substantially independently of one another while still being supplied with requisite and/or useful information that may otherwise be unattainable (e.g., without the DDI providing a medium through which two or more drivers can communicate). Similarly, the audio driver may be unable to open and/or close the wireless audio channel, so the audio driver may issue a request to the Bluetooth profile driver (e.g., via the DDI) to open and/or close the wireless audio channel At 308 in the example method 300, a wireless audio channel is opened via the wireless communication drive based upon a request from the driver responsible for controlling the time sensitive channel. For example, an audio driver may make a request to the Bluetooth profile driver that requests the Bluetooth profile driver top open the wireless audio channel.

At 310 in the example method 300, time sensitive data (e.g., audio data) is routed through the open wireless communication channel (e.g., and the wireless sideband channel) and, at 312, wireless communication data is routed through the wireless communication driver.

The example method 300 ends at 314.

Figure 4:
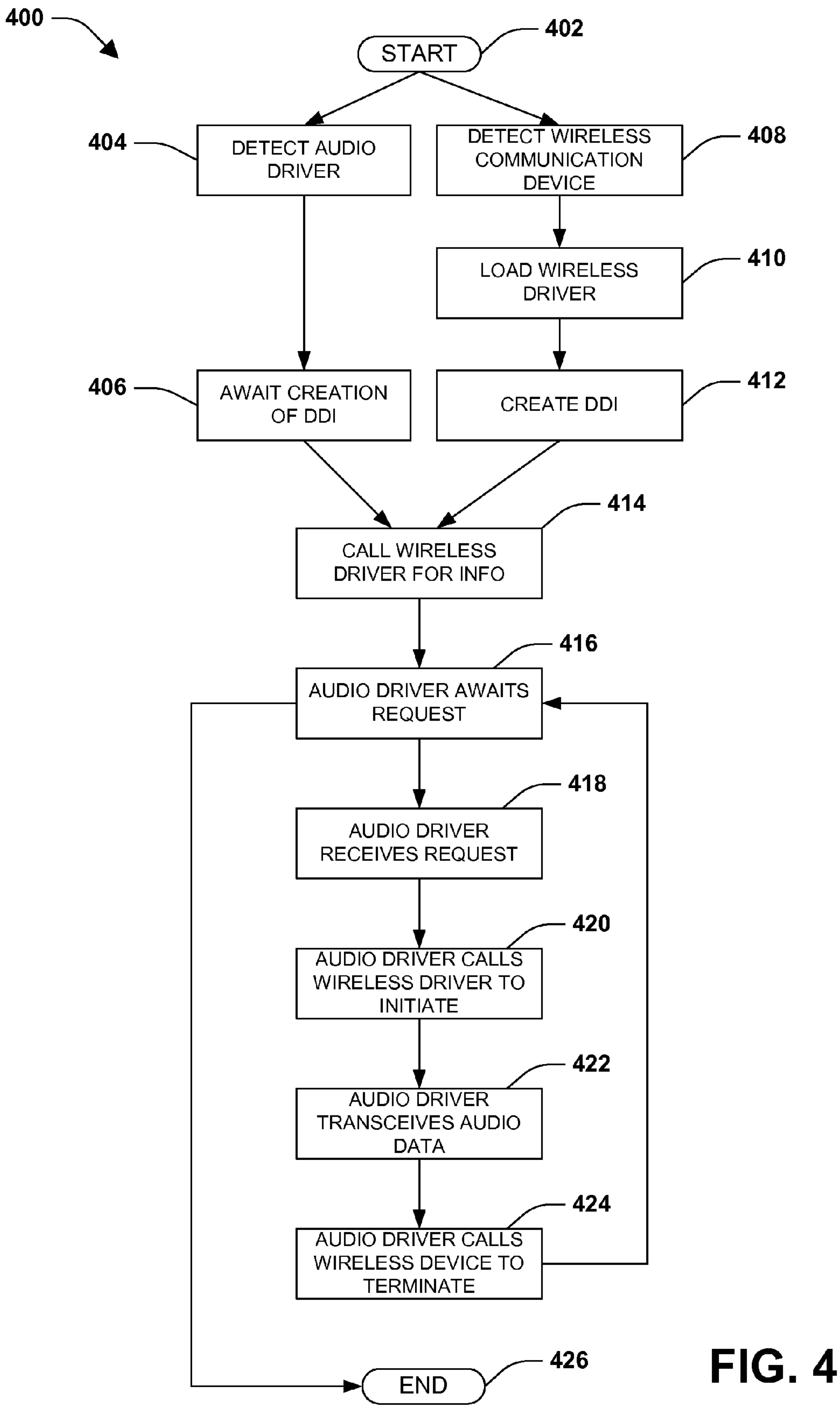
FIG. 4 is an exemplary method for connecting a wireless communication device with a computer system.

FIG. 4 illustrates an example method 400 for opening a wireless audio channel via a wireless communication driver based upon a request (e.g., also referred to herein as a call) from an audio driver. The method begins at 402 and an audio driver is detected at 404. The audio driver is configured to control a sideband connection (e.g., also referred to herein as a sideband audio channel) through which audio data is routed between an application and a controller. Once the audio driver is detected, a software driver for the audio driver (e.g., if the audio driver is a hardware component) may be loaded, and at 406 the audio driver may await the creation of a device driver interface (DDI).

Before the audio driver is detected, concurrently with the audio driver being detected, and/or after the audio driver is detected, a connection (e.g., pairing) of a wireless communication device (e.g., such as a Bluetooth headset) and a computer system (e.g., personal computer, mobile device, etc.) may be detected and/or discovered at 408 in the example method 400, and at 410 in the example method 400, a wireless driver from the device (e.g., such as a wireless profile driver, including, but not limited to a hands-free profile driver, headset profile driver, and/or advanced audio distribution profile) may be loaded.

At 412 in the example method 400, the wireless profile driver may create the DDI that the audio driver is awaiting at 406. As described above, the DDI is configured to operably couple the wireless profile driver with the audio driver. In this way, the audio driver may communicate with the wireless profile driver and/or the wireless profile driver may communicate with the audio driver, for example.

At 414 in the example method 400, the audio driver makes a request (e.g., also referred to herein as a call) to the wireless profile driver via the DDI to retrieve basis information about the wireless communication device, such as its capabilities and/or setup information, for example.

At 416 in the example method 400, the audio driver awaits a system request to render and/or capture audio and/or awaits other system status information. For example, the audio driver may await a request from an application to open the sideband audio channel and/or to request the wireless profile driver to open the wireless audio channel, for example.

At 418, the audio driver receives the request to render and/or capture audio data from the wireless communication device, and the audio driver initiates a call to the wireless profile driver via the DDI requesting the wireless profile driver to establish a wireless communication channel through with audio data can be transmitted to the wireless communication device at 420 of the example method 400.

At 422 in the example method 400, the audio driver renders and/or captures audio data through the sideband audio channel, and may receive status updates from the HFP driver through the DDI. Such status updates may comprise information indicative whether the wireless audio channel is still open and/or functioning for example, and/or may comprise other information that is relevant to the audio driver, for example.

At 424 in the example method, the audio driver makes a request to the wireless profile driver via the DDI requesting that the wireless profile driver terminate the wireless audio channel. In this way, the audio driver indirectly controls whether the wireless audio channel (e.g., which is controlled by the wireless profile driver) is open or closed, for example.

The example method 400 ends at 426.

Figure 5:
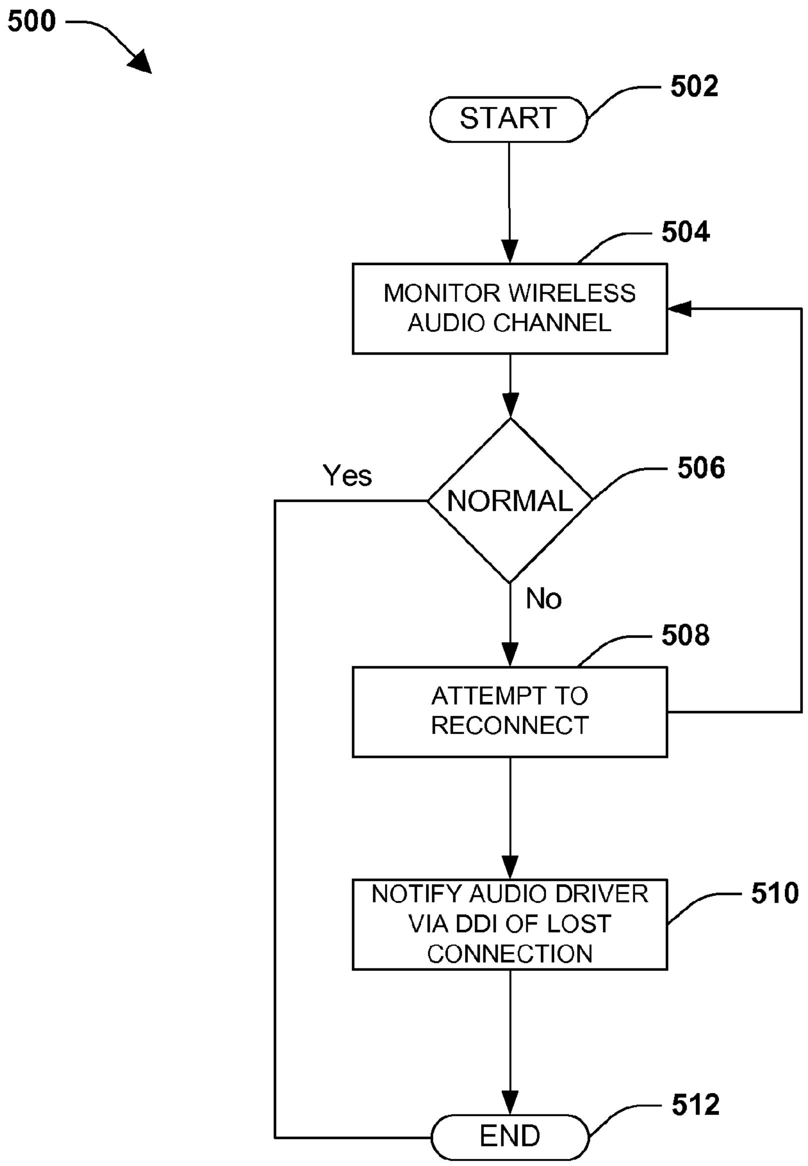
FIG. 5 is an exemplary method for providing information to an audio driver regarding a connection of a wireless audio channel.

FIG. 5 illustrates an example method 500 for monitoring a wireless audio channel (e.g., through which audio or other time sensitive data is transmitted between a controller and a wireless communication device). The example method 500 begins at 502 and at 504 the wireless audio channel is monitored. For example, a wireless profile driver may be configured to monitor the wireless audio channel to determine with the wireless communication device has disconnected from a computer system.

At 506, a decision is made (e.g., by the wireless profile driver) regarding whether the wireless communication device disconnected from the computer system normally or unexpected. If the wireless communication device disconnected normally, the example method 500 ends at 512.

If the wireless communication device did not disconnect normally, an attempt is made at 508 to reestablish the wireless audio channel between the controller of the computer system and the wireless communication device. If the wireless profile driver, for example, is able to reestablish the connection with the wireless communication device within a specified interval and/or before a specified number of attempts have been reached, the wireless profile driver, for example, may continue to monitor the wireless audio channel at 504 (e.g., because the connection has been reestablished). However, if the wireless profile driver, for example, is not able to reestablish the connection with the wireless communication device within a specified interval and/or before a specified number of attempts have been reached, the wireless profile driver may notify an audio driver at 510 via a DDI that the wireless audio channel has been disconnected (e.g., so that the audio driver can close an audio sideband channel).

The example method 500 ends at 512.

Figure 6:
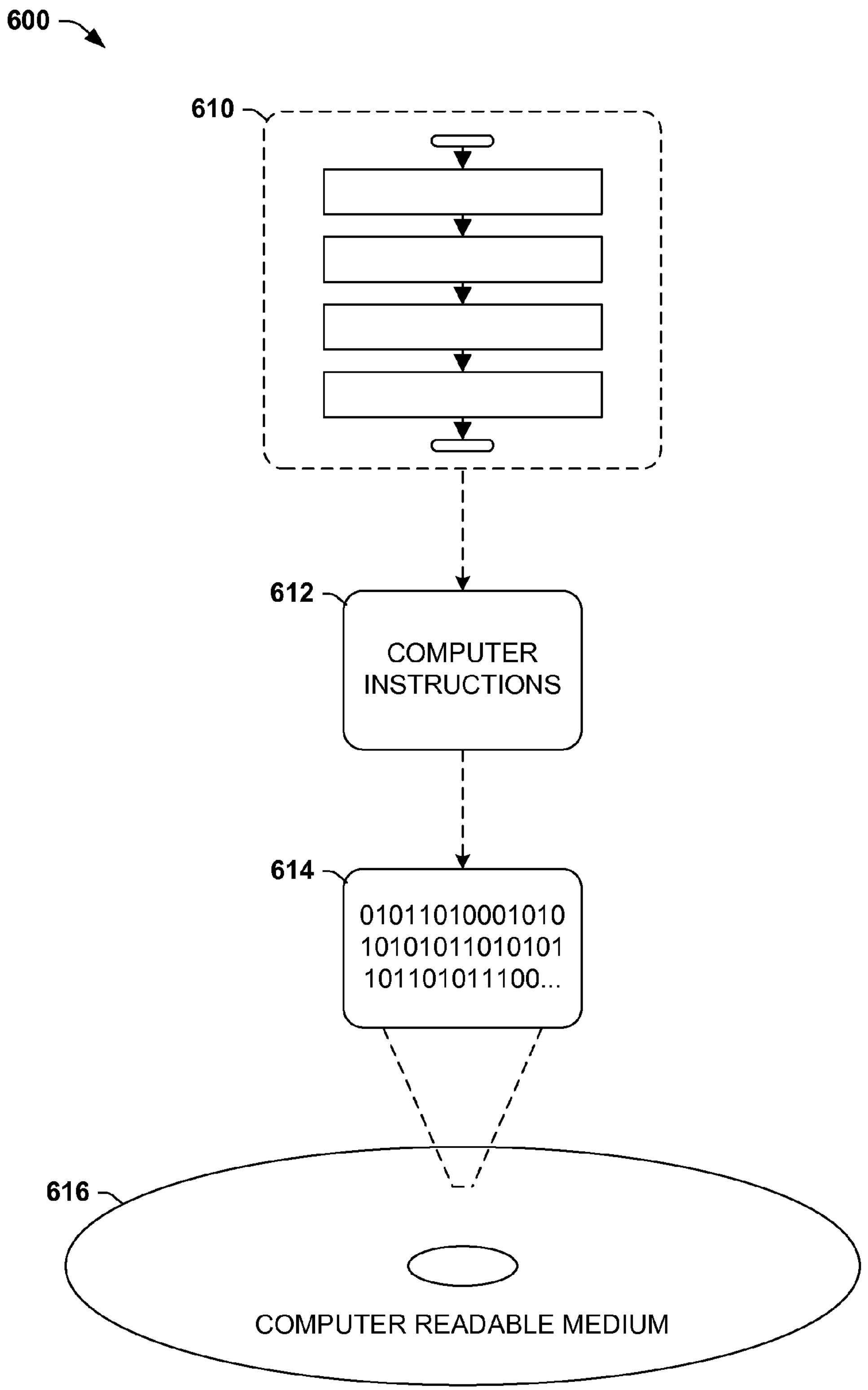
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as at least some of the exemplary method 300 of FIG. 3, for example. In another such embodiment, the processor-executable instructions 612 may be configured to implement a system, such as at least some of the exemplary system 100 of FIG. 1 and/or 200 of FIG. 2, for example. Many such computer-readable media 616 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
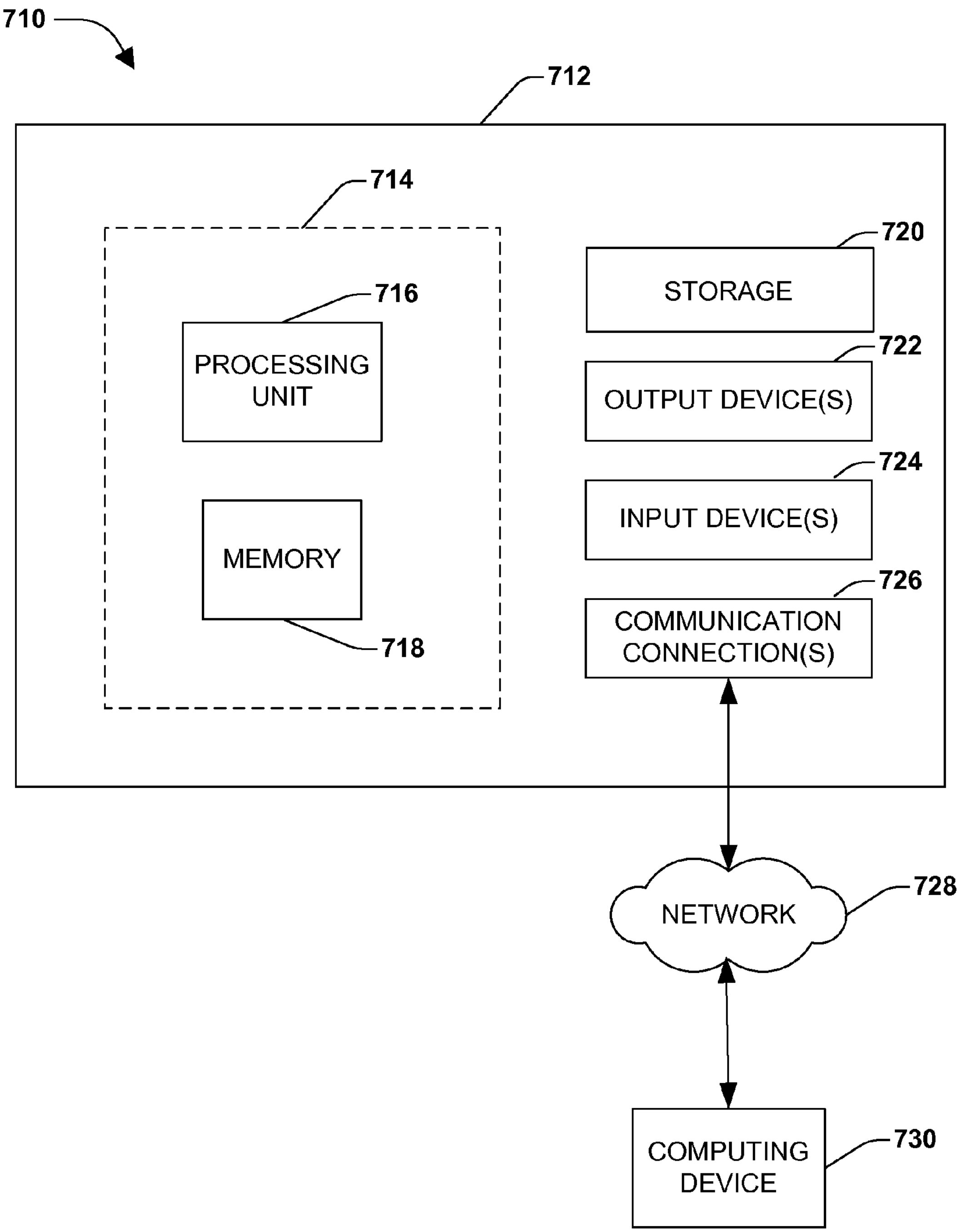
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example), or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:

receiving, at a device driver interface implemented at a computer system, a request from a first driver implemented at the computer system seeking information about a communication device, the device driver interface operably coupling a second driver implemented at the computer system, through which time insensitive data is routed, to the first driver, through which time sensitive data is routed;

at the device driver interface, after receiving a request from a first driver implemented at the computer system seeking information about a communication device, receiving the information about the communication device from the second driver; and after receiving the information about the communication device from the second driver at the device driver interface, providing the information about the communication device to the first driver from the device driver interface.

2. The method of claim 1, wherein the time sensitive data is not routed through the second driver.

3. The method of claim 1, the wherein time insensitive data is not routed through the first driver.

4. The method of claim 1, further comprising routing, from the second driver to the first driver via the device driver interface, a notification that a wireless audio channel between the computer system and the wireless communication device has been disconnected.

5. The method of claim 1, wherein the information corresponds to a type of wireless communication device.

6. The method of claim 1, the second driver comprising a Bluetooth profile driver.

7. The method of claim 1, comprising receiving, at the device driver interface, a call from the audio driver requesting that the second driver open a wireless communication channel for transmitting the time sensitive data to the wireless communication device.

8. The method of claim 7, further comprising providing the call to the second driver.

9. The method of claim 1, further comprising receiving, at the device driver interface, a call from the second driver requesting that that first driver open a sideband audio channel of the computer system.

10. The method of claim 1, the wireless communication device comprising a Bluetooth headset.

11. The method of claim 9, further comprising providing the call to the first driver.

12. A system for routing audio between a wireless communication device and a computer system, comprising:

a first driver implemented on the computer system through which audio data is routed between the wireless communication device and the computer system;

a second driver implemented on the computer system through which wireless communication data is routed between the wireless communication device and the computer system; and a device driver interface component implemented on the computer system configured to operably couple the first driver to the second driver, the device driver interface component configured to:

at the device driver interface, receive a call from the first driver requesting that the second driver open a wireless communication channel for transmitting the audio data to the wireless communication device; and after receiving the call from the first driver requesting that the second driver open a wireless communication channel for transmitting the audio data to the wireless communication device, at the device driver interface, provide the call from the device driver interface to the second driver.

13. The system of claim 12, the device driver interface component further configured to:

receive a notification from the second driver regarding a status of the wireless communication channel; and provide the notification to the first driver.

14. The system of claim 12, the device driver interface component further configured to:

receive details related to the wireless communication device from the second driver; and provide the details to the first driver.

15. The system of claim 12, wherein at least one of the wireless communication data is not routed through the first driver or the audio data is not routed through the second driver.

16. The system of claim 12, the second driver comprising a Bluetooth profile driver.

17. The system of claim 12, wherein the device driver interface component is configured to:

receive a second call from the second driver requesting that the first driver open a sideband audio channel of the computer system; and provide the second call to the first driver.

18. The system of claim 14, wherein the details correspond to a type of wireless communication device.

19. The system of claim 12, the wireless communication device comprising a Bluetooth device.

20. A method comprising:

receiving, at a device driver interface at a computer system, a call from a second driver at the computer system requesting that an first driver at the computer system open a sideband audio channel of the computer system, the device driver interface operably coupling the second driver, through which time insensitive data is routed, to the first driver, through which time sensitive data is routed; and at the device driver interface, after receiving the call from the second driver at the computer system requesting that the first driver at the computer system open the sideband audio channel of the computer system, providing the call from the device driver interface to the first driver, after which, the first driver opens the sideband audio channel of the computer system.

* * * * *